United States Patent
Demuth

(10) Patent No.: US 10,781,793 B2
(45) Date of Patent: Sep. 22, 2020

(54) METHOD FOR OUTPUTTING CONTROL INSTRUCTIONS OR EVENT MESSAGES FOR A FIRST WIND FARM BASED ON DATA RECEIVED FROM A SECOND WIND FARM

(71) Applicant: Wobben Properties GmbH, Aurich (DE)

(72) Inventor: Simon Demuth, Hage (DE)

(73) Assignee: Wobben Properties GmbH, Aurich (DE)

( * ) Notice: Subject to any disclaimer, the term of this patent is extended or adjusted under 35 U.S.C. 154(b) by 94 days.

(21) Appl. No.: 15/778,118

(22) PCT Filed: Nov. 9, 2016

(86) PCT No.: PCT/EP2016/077035
§ 371 (c)(1),
(2) Date: May 22, 2018

(87) PCT Pub. No.: WO2017/089129
PCT Pub. Date: Jun. 1, 2017

(65) Prior Publication Data
US 2018/0347545 A1    Dec. 6, 2018

(30) Foreign Application Priority Data
Nov. 24, 2015   (DE) .................. 10 2015 120 306

(51) Int. Cl.
*F03D 7/04*     (2006.01)
*F03D 80/40*    (2016.01)
(Continued)

(52) U.S. Cl.
CPC ............ *F03D 7/048* (2013.01); *F03D 7/047* (2013.01); *F03D 17/00* (2016.05); *F03D 80/10* (2016.05); *F03D 80/40* (2016.05); *Y02E 10/723* (2013.01)

(58) Field of Classification Search
CPC .................................................. Y02E 10/723
(Continued)

(56) References Cited

U.S. PATENT DOCUMENTS 7,025,567 B2 *    4/2006   Wobben ............... F03D 7/0224
                                                  415/118
2005/0090937 A1 * 4/2005   Moore .................... F03D 7/047
                                                  700/286
(Continued)

FOREIGN PATENT DOCUMENTS

DE    102010063396 A1    6/2012
DE    102013002662 A1    8/2014
(Continued)

OTHER PUBLICATIONS

Dvorak, "How to monitor 2,478 wind turbines from one local," Jan. 15, 2013, retrieved from https://www.windpowerengineering.com/how-to-monitor-2478-wind-turbine-at-once/, 4 pages.

*Primary Examiner* — Suresh Suryawanshi
(74) *Attorney, Agent, or Firm* — Seed IP Law Group LLP

(57) ABSTRACT

A method for outputting control instructions to at least one first wind power installation or at least one first wind farm using an evaluation device or for outputting an event message relating to an operating state of the at least one first wind power installation or the at least one first wind farm using the evaluation device is provided. Data is received by the evaluation device from at least one further wind power installation or from at least one further wind farm and the control instructions or the event messages are generated by evaluating the data and are output by the evaluation device. An evaluation device and a system having the evaluation device for carrying out the method are also provided.

18 Claims, 3 Drawing Sheets

(51) Int. Cl.
  *F03D 17/00* (2016.01)
  *F03D 80/10* (2016.01)
(58) Field of Classification Search
  USPC .................................................. 700/287
  See application file for complete search history.

(56) References Cited

U.S. PATENT DOCUMENTS

| | | | |
|---|---|---|---|
| 2009/0039650 A1 | 2/2009 | Nies | |
| 2010/0133822 A1* | 6/2010 | Mixter, Jr. | F03D 7/047 290/44 |
| 2010/0143120 A1 | 6/2010 | Kumar et al. | |
| 2010/0183440 A1* | 7/2010 | Von Mutius | F03D 7/0264 416/1 |
| 2010/0274400 A1* | 10/2010 | Ormel | F03D 7/043 700/287 |
| 2011/0025062 A1* | 2/2011 | Llombart Estopinan | F03D 7/028 290/44 |
| 2011/0270577 A1 | 11/2011 | Mihok et al. | |
| 2012/0130678 A1* | 5/2012 | Ishioka | G05B 23/024 702/179 |
| 2012/0136630 A1* | 5/2012 | Murphy | G05D 1/0094 702/188 |
| 2013/0214534 A1* | 8/2013 | Nakamura | F03D 7/00 290/44 |
| 2014/0058615 A1 | 2/2014 | Hatch et al. | |
| 2015/0093243 A1 | 4/2015 | Canal Vila et al. | |
| 2015/0148974 A1* | 5/2015 | Diedrichs | H02J 3/16 700/287 |
| 2015/0308413 A1* | 10/2015 | Bhaskar | F03D 7/028 290/44 |
| 2016/0027294 A1* | 1/2016 | Magnus | F03D 80/40 340/514 |
| 2016/0115942 A1* | 4/2016 | Noto | F03D 17/00 290/44 |
| 2016/0333852 A1* | 11/2016 | Busker | H02P 9/14 |
| 2016/0336888 A1* | 11/2016 | Busker | H02J 3/24 |

FOREIGN PATENT DOCUMENTS

| | | |
|---|---|---|
| EP | 2175540 A2 | 4/2010 |
| EP | 2520794 A1 | 11/2012 |
| EP | 2853729 A1 | 4/2015 |
| GB | 2475609 A | 5/2011 |
| JP | 2009156171 A | 7/2009 |
| JP | 2012039802 A | 2/2012 |
| WO | 0180395 A2 | 10/2001 |
| WO | 2008/086801 A2 | 7/2008 |
| WO | 2014002274 A1 | 1/2014 |

* cited by examiner

METHOD FOR OUTPUTTING CONTROL INSTRUCTIONS OR EVENT MESSAGES FOR A FIRST WIND FARM BASED ON DATA RECEIVED FROM A SECOND WIND FARM

BACKGROUND

Technical Field

The invention relates to a method for outputting control instructions to a wind power installation or a wind farm or for outputting event messages for a wind power installation or a wind farm. The invention also relates to an evaluation device for carrying out the method and to a system having the evaluation device for carrying out the method.

Description of the Related Art

It is known that wind power installations have a multiplicity of sensors. The sensors are used to monitor the operating state of a wind power installation, for example. Temperatures in the region of the generator of the wind power installation, for example, are recorded using the temperature sensors and indicate a fault-free function of the wind power installation as long as they are in a predefined normal range or tolerance range.

If measured values of the temperature depart from the tolerance range, a malfunction of the wind power installation is determined. In this case, the wind power installation must be switched off and disconnected from the network, for example. These tolerance ranges in which temperature measured values indicate a correctly functioning wind power installation must usually be selected to be large. A large tolerance range ensures that high measured values from wind power installations which are exposed to high temperatures in the summer, for example, but do not fundamentally indicate a fault, are also not interpreted as a malfunction.

In a similar manner, temperature values during operation of a wind power installation in cold regions or in cold seasons, which are measured in the region of the sensor and are below a normal value, must likewise be classified as a fault-free function of the wind power installation as long as they are not below a limit value of the tolerance range.

As a result of these broadly predefined tolerance ranges being selected for different sensors, malfunctions in a wind power installation are therefore discovered only when the malfunction has resulted in serious influence on the operating behavior.

In the priority application for the present application, the German Patent and Trademark Office researched the following prior art: GB 2 475 609 A, US 2009/0039650 A1, US 2010/0143120 A1, WO 2001/80395 A2.

BRIEF SUMMARY

Expeditious detection of measured values, which differ from normal values or extraordinary operating states of a wind power installation, is disclosed.

In this respect, the invention relates to a method for outputting a control instruction to at least one first wind power installation or at least one first wind farm using an evaluation device and/or for outputting an event message relating to the operating state of the at least first wind power installation or the first wind farm using the evaluation device. Data are received by the evaluation device from at least one further wind power installation or from at least one further wind farm. The first wind power installation is a different wind power installation to the further wind power installation and is preferably arranged in a further wind farm which differs from the first wind farm. The first wind farm is likewise a different wind farm to the further wind farm.

The received data are evaluated in the evaluation device and a control instruction or an event message for the first wind power installation or the first wind farm is output on the basis of the received and evaluated data.

Therefore, in order to generate a control instruction or an event message for a first wind power installation or a first wind farm, data which are supplied to an evaluation device from a further wind power installation or a further wind farm are thus processed in the evaluation device.

A data connection, which is a data line or a wireless data connection, is preferably provided between the further wind farm or the further wind power installation and the evaluation device for the purpose of transmitting the data to the evaluation device.

The invention therefore makes it possible to take into account data from a further wind power installation or a further wind farm, which are measured values for example, for the purpose of assessing the operating state and for intervening in the operating state of a first wind power installation or a first wind farm.

If, for example, operating parameters of the first wind power installation or of the first wind farm therefore differ significantly from the parameters or measured values from the further wind power installation or from the further wind farm, which are received as data, this makes it possible to infer an unusual operating state of the first wind power installation or of the first wind farm. It is therefore already possible to react to unusual operating parameters of the first wind power installation or of the first wind farm in good time without the operating parameters of the first wind power installation or of the first wind farm having to go outside a tolerance range.

According to one embodiment, a first controller of the first wind power installation or of the first wind farm and a further controller of the further wind power installation or of the further wind farm are connected via a data connection. The evaluation device is part of the first controller of the first wind power installation or of the first wind farm.

Therefore, the evaluation device is easily integrated into an existing first controller, with the result that only a data connection must be established between the first controller and the further controller of the further wind power installation or the further wind farm.

According to a further embodiment, a first controller of the first wind power installation or of the first wind farm and a further controller of the further wind power installation or of the further wind farm are connected to a control room via a data connection, where the evaluation device is part of the control room.

A central control room is therefore provided, to which a plurality of wind power installations or a plurality of wind farms are therefore connected by means of their controllers. Control instructions for wind power installations or wind farms are therefore centrally generated or event messages for wind power installations or wind farms are therefore centrally output in the control room using the evaluation device. In this case, the operating parameters, for example sensor values from other wind power installations or other wind farms, are taken into account in the control room.

Central evaluation and control for all wind power installations or wind farms connected to the control room are therefore possible, with the result that deviating parameters, values or measured values from all connected wind power installations or wind farms can be centrally detected and it is possible to react to faults in good time.

According to one advantageous embodiment, the method comprises the step in which first data which correspond to first measured values and are recorded using at least one sensor of the first wind power installation or of the first wind farm are received by the evaluation device. The method also comprises receiving further data which correspond to further measured values and are recorded using at least one further sensor of at least one further wind power installation which differs from the first wind power installation or a further wind farm which differs from the first wind farm.

The method also comprises the step of controlling the first wind power installation or the first wind farm on the basis of the first and further measured values and/or outputting an event message relating to the operating state of the first wind power installation or of the first wind farm on the basis of the first and further measured values.

Therefore, in order to control a first wind power installation or a first wind farm, not only the sensor values or measured values measured in the wind power installation or the wind farm are therefore used for the control, but rather the further measured values from another wind farm or another wind power installation, which are received and recorded using the evaluation device, are also used in addition to said values in order to output control instructions or event messages relating to the operating state of the first wind power installation or of the first wind farm using the evaluation device.

According to a further advantageous embodiment, the evaluation device is used to output a control instruction and/or an event message, wherein first measured values from sensors of the first wind power installation or the first wind farm and further measured values from sensors of at least one further wind power installation or one further wind farm are supplied to the evaluation device.

In this case, the sensors which are arranged in the first and further wind power installations or in the first or further wind farm are each arranged in a substantially identical region or a substantially identical position of the wind power installations or of the wind farms.

It is therefore advantageously possible to accurately form reference values from the further measured values since only values from sensors which are exposed to actually comparable conditions within the first and further wind power installations or the first and further wind farms during operation used to form reference values.

According to a further embodiment, the evaluation device outputs an event message, in particular a fault message, if a deviation of the measured values of the first wind power installation or of the first wind farm from the further measured values or from a reference value, which is determined from the further measured values and is, for example, a mean value of the further measured values or a value of the further measured values which is dependent on the mean value, is detected and the deviation is above a predefined threshold value.

Therefore, a reference value, for example, is thus determined from the further measured values in the evaluation device, for example by mean value formation. Furthermore, a threshold value is predefined or determined for this reference value. If a first measured value now deviates from the reference value by more than the predefined threshold value, the first measured value is interpreted as incorrect by the evaluation device. This then infers a malfunction of the first wind power installation or of the first wind farm.

According to a further embodiment, first and further measured values from the sensors of first and further wind power installations or wind farms, which are at a maximum predefined distance of less than 100 km, in particular 500 m, 5 km, 10 km, 20 km or 50 km, from one another are used to output a control instruction and/or an event message.

Only further measured values from further wind power installations or wind farms which are at a maximum distance of 100 km from a first wind power installation or from a first wind farm are therefore used in an evaluation device which is arranged, for example, in the region of the first wind power installation or the first wind farm.

This ensures that it is possible to compensate for the influence of environmental conditions when considering the measured values, for example the influence on the outside temperature which only equally affects the first and further measured values when the sensors or wind power installations are situated substantially in the same region.

If these distances were exceeded, a comparison would be more and more difficult or would no longer be possible at all. In particular, an even shorter predefined distance, namely a distance of a few 500 m to a few km for example, is advantageous for forming particular event messages or particular control instructions.

According to a further embodiment, if an ice build-up on one of the further wind power installations is reported to the evaluation device by means of the further data, control data for activating the ice warning lights are output to the first wind power installation or to the first wind farm using the evaluation device. Ice warning lights of a first wind farm can therefore already be activated with the aid of an ice build-up detected on further wind power installations even though an ice build-up has not yet been detected in the first wind power installations.

According to a further embodiment, the evaluation device receives data in the form of a synchronization signal from a further wind power installation or a further wind farm and generates a control instruction in the form of a further synchronization signal for the first wind power installation or the first wind farm in order to cause the aviation obstruction lights of the first wind power installation or of the first wind farm to flash in sync with the aviation obstruction lights of the further wind power installations or further wind farms.

Synchronous uniform flashing of the aviation obstruction lighting system has hitherto been possible only using complicated methods such as synchronization using GPS data, but even more accurate simple synchronization using a data connection between the wind power installations or wind farms is now possible.

According to a further advantageous embodiment, the evaluation device has a control interface for connecting further energy producers for the purpose of interchanging data. The further energy producers are then controlled by means of the control interface, in which case data are interchanged with the further energy producer for this purpose by means of the evaluation device. For the purpose of control, regulation values, such as desired power values, desired reactive power values and the like, are transmitted to the further energy producer, in particular, or data are received by the evaluation device from the further energy producer via the interface.

It is therefore possible to autonomously control the wind power installations and further energy producers independently of a network operator by means of direct data interchange. In particular, the evaluation device, for example, can output a desired power value to the further energy producer if sufficient power cannot be fed into the supply network by the first wind farm and the further wind farm, for example on account of a slump.

According to a further embodiment, the evaluation device is part of the first wind farm and replaces a controller of the first wind farm, that is to say the wind farm regulator of the first wind farm. The evaluation device then receives regulation values, such as desired power values, desired reactive power values and the like, from a wind farm regulator of at least one further wind farm via the data connection.

A wind farm can therefore be regulated by a wind farm regulator of a further wind farm, thus making it possible to save on the costs for a first wind farm, for example.

According to a further embodiment, weather data are received from the further wind power installation or the further wind farm via the data connection and are processed in the evaluation device. Control instructions for controlling the first wind power installation or the first wind farm are transmitted on the basis of the weather data.

Predefined desired values can therefore be additionally taken into account by the network operator, for example, on the basis of weather forecasts when controlling the first wind power installation or the first wind farm. In this case, the weather forecasts are based not only on data detected using the environmental sensors of the first wind power installation or of the first wind farm. As a result, weather data can be predicted and used in a far more accurate manner.

Provided is an evaluation device having an interface for outputting a control instruction to at least one first wind power installation or a first wind farm and/or for outputting an event message relating to the operating state of the at least first wind power installation or the at least first wind farm. The evaluation device furthermore also comprises a further interface for receiving data which are transmitted from at least one further wind power installation, in particular a further wind farm, or at least one further wind farm to the evaluation device. According to an embodiment, the evaluation device is set up to carry out a method according to one of the preceding embodiments.

According to a further embodiment, the evaluation device comprises a control interface for connection to further energy producers. This control interface is used to interchange data with further energy producers and to control the energy producers. In particular, the interface is used to transmit regulation values, such as desired power values, desired reactive power values and the like, and/or to receive such data via the interface.

Provided is a system having at least one first wind power installation or at least one first wind farm and at least one further wind power installation or at least one further wind farm. The further wind power installation is, in particular, a wind power installation in a further wind farm which differs from the first wind farm.

The system also comprises a data connection for interchanging data between the at least first wind power installation or the at least first wind farm and the at least one further wind power installation or the at least one further wind farm. According to one embodiment, the system is set up to carry out a method according to one of the above-mentioned embodiments and comprises the evaluation device according to the invention according to a further special exemplary embodiment.

BRIEF DESCRIPTION OF THE SEVERAL VIEWS OF THE DRAWINGS

Exemplary embodiments of the present invention are explained in more detail below, by way of example, with reference to the accompanying figures, in which.

DETAILED DESCRIPTION

Figure 1:
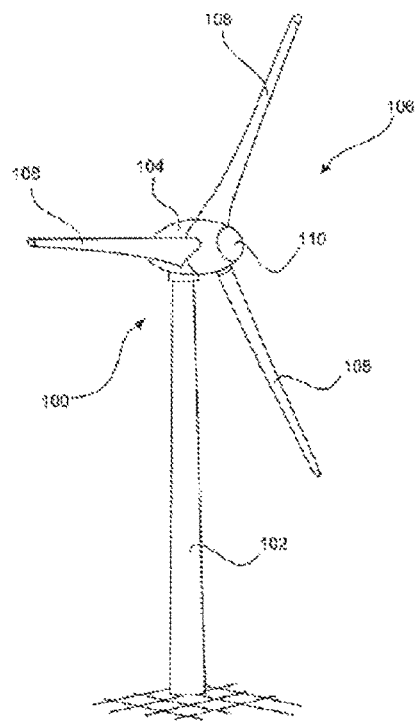
FIG. 1 shows a wind power installation.

FIG. 1 shows a wind power installation 100 having a tower 102 and a nacelle 104. A rotor 106 having three rotor blades 108 and a spinner 110 is arranged on the nacelle 104. During operation, the rotor 106 is caused to carry out a rotational movement by the wind and thereby drives a generator in the nacelle 104.

The wind power installation 100 of FIG. 1 can also be operated in combination with a plurality of wind power installations 100 in a wind farm, as described below with reference to FIG. 2.

Figure 2:
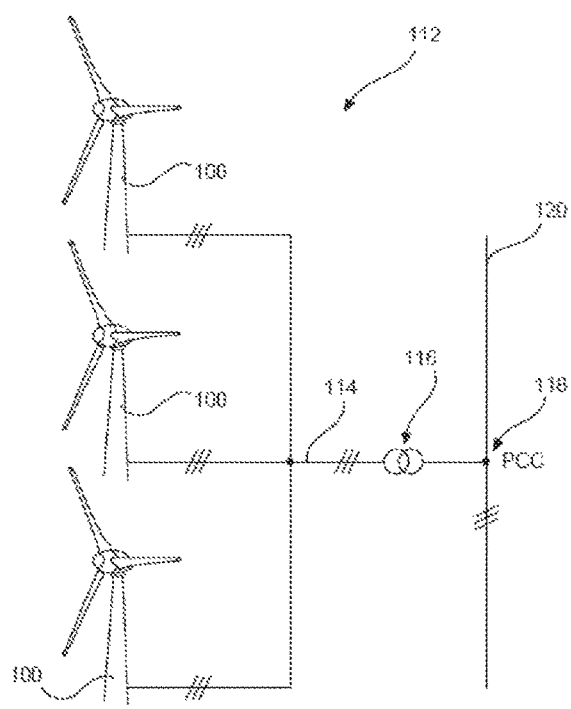
FIG. 2 shows a wind farm.

FIG. 2 illustrates a wind farm 112 having three wind power installations 100 by way of example. The wind power installations 100 may be the same or different. The wind power installations 100 are therefore representative of fundamentally any desired number of wind power installations 100 in a wind farm 112. The wind power installations 100 provide their power, namely the generated current in particular, via an electrical farm network 114. In this case, the respectively generated currents or powers from the individual wind power installations 100 are added and a transformer 116 is usually provided, which transformer steps up the voltage in the farm in order to then feed it into the supply network 120 at the feed-in point 118 which is also generally referred to as the PCC.

FIG. 2 is only a simplified illustration of a wind farm 112 which does not show any power control, for example, even though power control is naturally present. The farm network 114 may also be different, for example, by virtue of a transformer also being present at the output of each wind power installation 100, for example, to name just one other exemplary embodiment.

Figure 3:
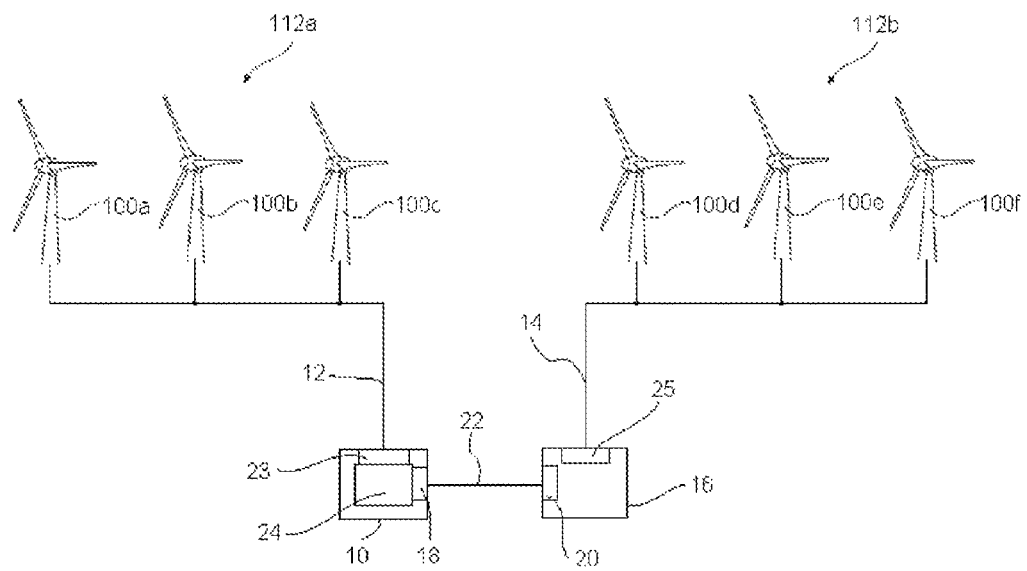
FIG. 3 shows a first wind farm and a further wind farm.

FIG. 3 now shows a first wind farm 112a and a further wind farm 112b. The first wind farm 112a has a first wind power installation 100a and two wind power installations 100b and 100c. The further wind farm 112b has a further wind power installation 100d and the wind power installations 100e and 100f.

The wind power installations 100a to 100c in the first wind farm 112a are connected to a first wind farm regulator 10 via a data connection 12. The wind power installations 100d to 100f are likewise connected to a further wind farm regulator 16 via a data line 14.

The wind farm regulators 10 and 16 are set up to receive different default values or desired values from a network operator in order to regulate the power production of the individual wind power installations 100a to 100f in the wind farms 112a, 112b. For this purpose, the wind farm regulators 10, 16 have an interface which is not depicted here, however.

In addition to the interface for specifying control values from the network operator, the first wind farm regulator 10 has an interface 18 and the further wind farm regulator 16 has an interface 20, the interfaces 18 and 20 being connected to one another via a data connection 22 for the purpose of interchanging data between the wind farm regulators 10, 16. The first wind farm regulator 10 also has an interface 23 and the further wind farm regulator 16 has an interface 25 in order to be able to interchange data with the respectively associated wind power installations 100a to 100f via the data connection 12, 14.

In the present case, the first wind farm regulator 10 also comprises an evaluation device 24. The evaluation device 24 is configured to receive data from the further wind farm 112b or from the further wind power installation 100d via the data line 22. The data are then processed in the evaluation device 24 and a control instruction is output to the further wind power installation 100a or the wind power installations 100a to 100c in the further wind farm 112a via the data line 12.

The evaluation device 24 is also configured to output an event message by virtue of the evaluation device also receiving and evaluating, via the data line 12, sensor data or data, which represent the state of the wind power installations 100a to 100c in the first wind farm 112a, in addition to the further data via the data line 22. The evaluation device 24 is therefore configured to output an event message, for example a fault message, on the basis of the first data or measured values received via the data line 12 and the further data or measured values received via the data line 22. This fault message can be displayed, for example, on a display of the first wind farm regulator 10.

Figure 4:
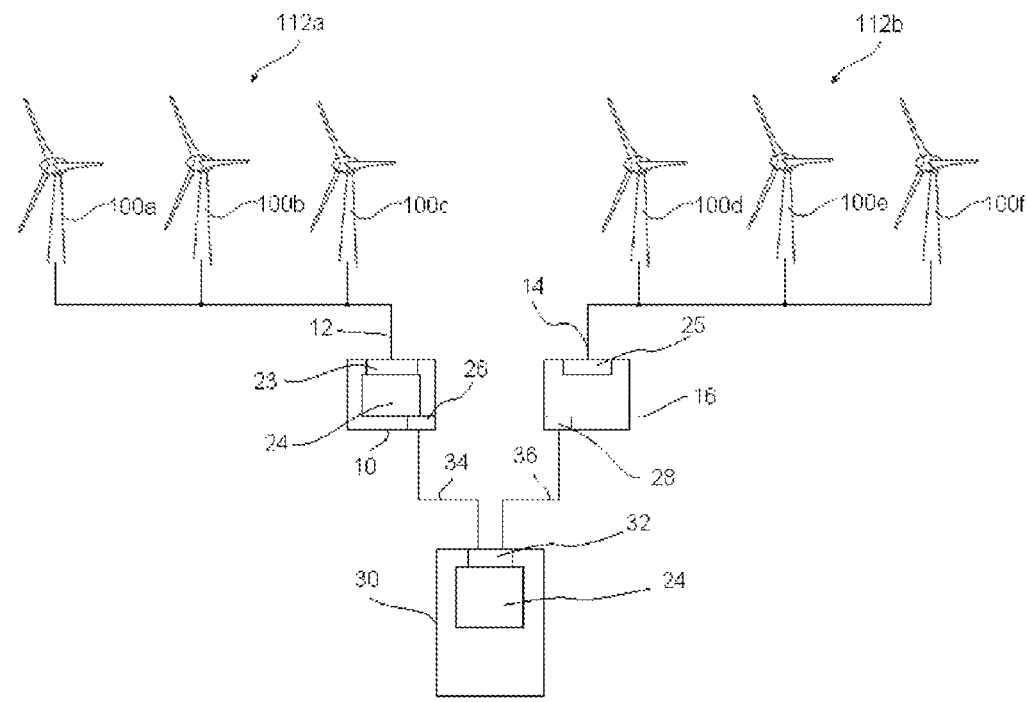
FIG. 4 shows the wind farms from FIG. 3 and a control room.

FIG. 4 shows an alternative exemplary embodiment of FIG. 3. Identical reference numerals correspond to identical features.

The wind farms 112a and 112b are each again connected to a wind farm regulator 10, 16, in which case the wind farm regulators 10, 16 do not have the interfaces 18 and 20. Instead, the first wind farm regulator 10 has an interface 26 and the further wind farm regulator 16 has an interface 28. In the exemplary embodiment in FIG. 4, the first wind farm regulator 16 does not have an evaluation device 24. Instead, the evaluation device 24 is part of a control room 30.

The control room 30 is, for example, a central data collection or control point to which a multiplicity of wind farms 112 are connected, the control room 30 being able to store and evaluate all recorded parameters or data from the connected wind power installations 100 or wind farms 112. The connected wind power installations 100 can also be remotely controlled using the control room 30.

The evaluation device 24 comprises an interface 32 to which the interfaces 26 and 28 of the wind farm regulators 10 and 16 are connected via data lines 34 and 36. The evaluation device 24 in the control room 30 receives further data from the further wind farm 112b via the data line 36 and the interface 32, these further data being measured values from the wind power installations 100d to 100f, for example. The evaluation device 24 also receives first data from the first wind farm 112a via the data line 34, which first data are measured values from the wind power installations 100a to 100c, for example. Control instructions for the first wind farm 112a are then generated in the evaluation device 24 on the basis of the first measured values and the further measured values, and the wind power installations 100a to 100c in the first wind farm 112a are controlled using these control instructions.

Event messages, for example fault messages, are also output on a display (not illustrated) of the control room 30 on the basis of the first and further data or measured values. For this purpose, the first and further data or measured values are processed on the basis of the example illustrated in the following FIG. 5.

Figure 5:
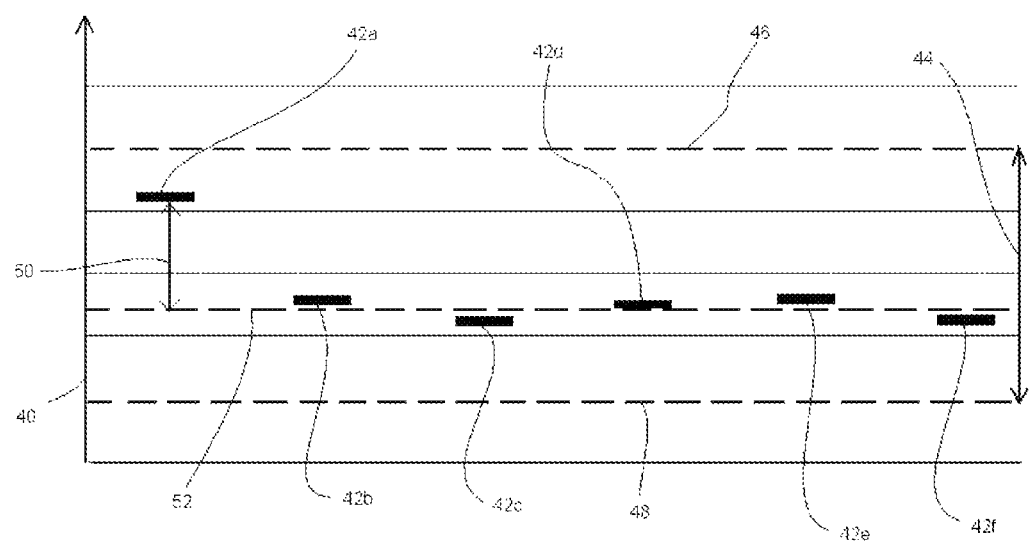
FIG. 5 shows measured values from a first wind power installation and from further wind power installations.

FIG. 5 shows a diagram representing measured values which are received from the first wind farm 112a and from the second wind farm 112b in the evaluation device 24. The vertical axis 40 corresponds to a temperature axis. The measured values 42a to 42f which are assigned to the individual wind power installations 100a to 100f are also represented. The measured values 42a to 42f each correspond to a measured temperature value in the region of a generator of the wind power installation 100a to 100f. The sensors are arranged at the substantially same position in all wind power installations 100a to 100f.

It is also assumed here that the wind farms 112a and 112b are at a maximum distance of 100 km. In addition, a tolerance range 44 is represented by the upper limit value 46 and the lower limit value 48. All measured values 42a to 42f are within the tolerance range 44. However, it can be discerned that the measured value from the first wind power installation 100a, which corresponds to the measured value 42a, differs from a mean value of the measured values 42b to 42f by more than a threshold value 50. It can therefore be assumed in the present case that there is a fault in the first wind power installation 100a even though the measured value 42a is in the tolerance range 44.

An event message, for example a fault message, can now be output here by the evaluation device 24 on account of the measured value 42a which differs from a reference value 52 represented by the mean value by more than a threshold value 50.

Even though the first wind power installation 100a is still operating in a permitted range defined by the tolerance range 44, an irregularity can therefore already be identified and service personnel can be sent to the first wind power installation 100a, which personnel can monitor and possibly eliminate the reason for the differing measured value 42a without the first wind power installation 100a having to be disconnected from the network on account of a fault. It is therefore possible to react to an imminent fault in good time.

The invention claimed is:

1. A method for controlling a first wind farm, the method comprising:
   receiving, by an evaluation device, data from at least one second wind farm,
   evaluating, using the evaluation device, the received data,
   determining, based on the received data, at least one control instruction for the first wind farm relating to an operating state of the first wind farm, and
   outputting, at an interface, the at least one control instruction to the first wind farm,
   wherein the first wind farm and the at least one second wind farm are connected to a control room via at least one data line, and the evaluation device is part of the control room, and
   wherein a plurality of wind farms are connected with the control room.

2. The method as claimed in claim 1, comprising:
   receiving first data indicative of first measured values captured using at least one first sensor of the first wind farm,
   receiving second data indicative of second measured values captured using at least one second sensor of the at least one second wind farm which is different from the first wind farm,
   controlling the first wind farm based on the first and second measured values, and
   outputting at least one event message relating to the operating state of the first wind farm based on the first and second measured values.

3. The method as claimed in claim 2, wherein first measured values from first sensors of the first wind farm and second measured values from second sensors of the at least one second wind farm are supplied to the evaluation device for outputting at least one of the at least one control instruction or the at least one event message, wherein the first sensors in the wind farms are each arranged in a substantially identical region or a substantially identical position.

4. The method as claimed in claim 2, wherein the at least one event message is a fault message.

5. The method as claimed in claim 1, wherein the first wind farm and the at least one second wind farm are at a maximum predefined distance of 100 km from each other.

6. The method as claimed in claim 2, comprising:
receiving the second data indicating an ice build-up on a wind power installation of the at least one second wind farm, and
outputting, by the evaluation device and to the first wind farm, control data for activating ice warning lights of wind power installations of the first wind farm.

7. The method as claimed in claim 1, comprising:
receiving, by the evaluation device, the data with a first synchronization signal from the at least one second wind farm, and
transmitting the at least one control instruction, to the first wind farm, as a second synchronization signal that is dependent on the first synchronization signal to cause aviation obstruction lights of wind power installations in the first wind farm or in the at least one second wind farm to synchronously flash.

8. The method as claimed in claim 1, wherein the evaluation device includes a control interface operable to connect further energy producers, that are not wind power installations, to the evaluation device for exchanging data with the evaluation device, wherein the further energy producers are controlled by data transmitted or received over the control interface.

9. The method as claimed in claim 1, comprising:
receiving, by the evaluation device, regulation values including a power value or a reactive power value from a second wind farm regulator of the at least one second wind farm via the interface.

10. The method as claimed in claim 1, comprising:
receiving, by the evaluation device, weather data via a data connection,
processing, by the evaluation device, the weather data, and
generating the at least one control instruction for controlling the first wind farm based on the weather data.

11. A device, comprising:
a first interface configured to output a control instruction to at least one first wind farm,
a second interface configured to receive data which are transmitted from a second wind farm, and
an evaluation device configured to:
receive the data over the second interface,
evaluate the received data,
determine, based on the received data, the control instruction, and
output the control instruction to the at least one first wind farm over the first interface.

12. The device as claimed in claim 11, comprising:
an interface configured to be connected to further energy producers that are not wind power installations.

13. A system, comprising:
the device as claimed in claim 11,
the at least one first wind farm,
the second wind farm, and
a data connection for exchanging data between the at least one first wind farm and the second wind farm.

14. The method as claimed in claim 4, comprising:
detecting if a deviation of a first measured value from a second measured value or a reference value determined from the second measured values and is above a predefined threshold, and
outputting the at least one event message if the deviation is above the predefined threshold.

15. The method as claimed in claim 14, comprising:
averaging the second measured values to determine an average of the further measured values, and
setting the reference value to the average of the second measured values.

16. The method as claimed in claim 5, wherein the maximum predefined distance is 500 m, 5 km, 10 km, 20 km or 50 km.

17. The method as claimed in claim 8, wherein the data transmitted or received over the control interface includes regulation values, desired power values or desired reactive power values.

18. The method as claimed in claim 9, wherein the evaluation device is part of the first wind farm or a first wind farm regulator of the first wind farm.

* * * * *